UNITED STATES PATENT OFFICE.

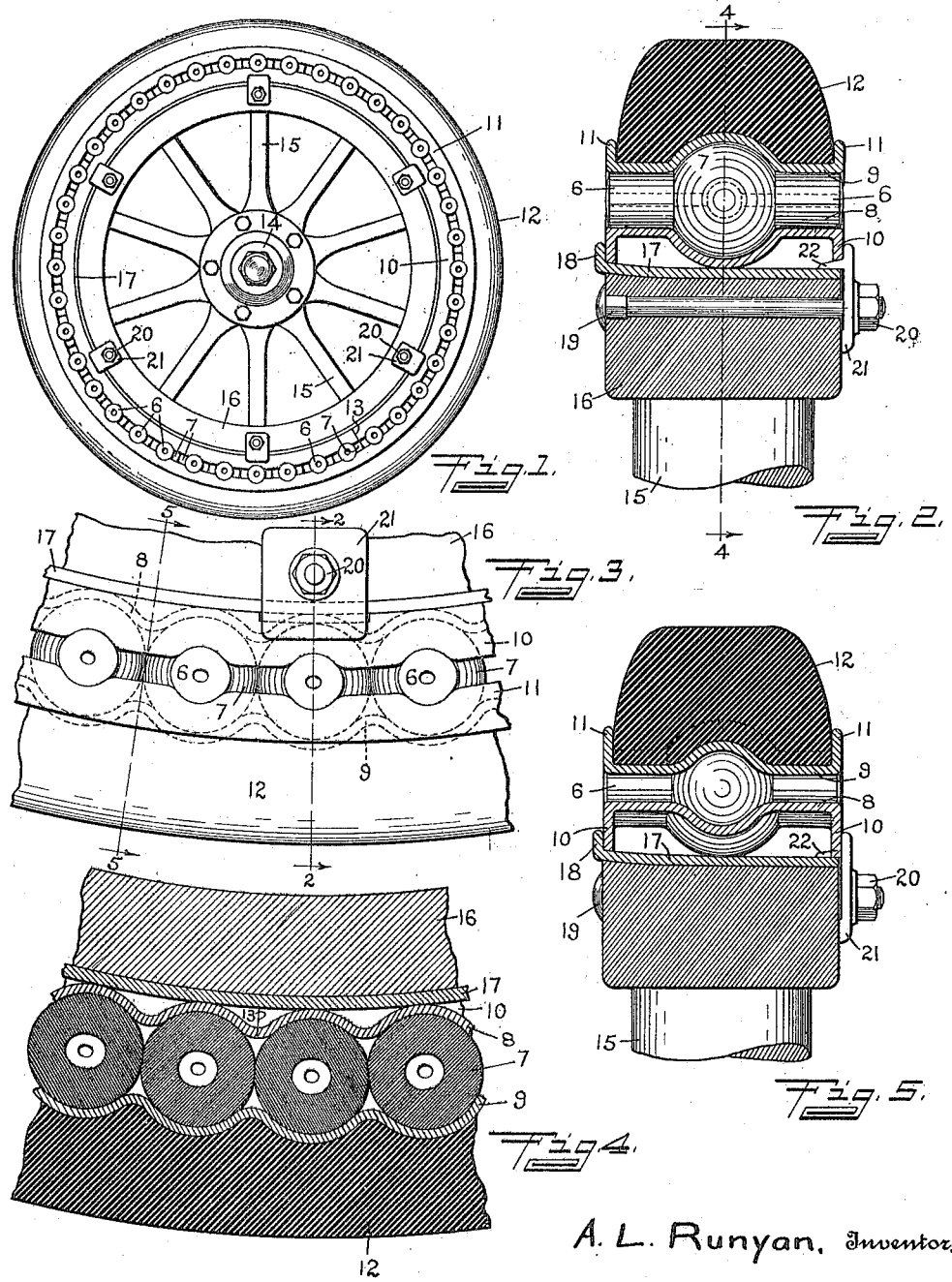

ARTHUR L. RUNYAN, OF WATERLOO, IOWA, ASSIGNOR TO RUNYAN CUSHION WHEEL COMPANY, OF OMAHA, NEBRASKA, A CORPORATION.

RESILIENT TIRE.

1,221,380.  Specification of Letters Patent.  Patented Apr. 3, 1917.

Application filed December 21, 1915. Serial No. 68,054.

*To all whom it may concern:*

Be it known that I, ARTHUR L. RUNYAN, a citizen of the United States, and a resident of Waterloo, in the county of Blackhawk and State of Iowa, have invented certain new and useful Improvements in Resilient Tires, of which the following is a specification.

My invention relates to resilient tires and wheels, and it is the object thereof to provide a tire for use on motor-vehicles and the like, having substantially the resilience and shock-absorbing capacity of a pneumatic tire, but so constructed as to be more durable than a pneumatic tire. In the tire constructed in accordance with my invention, certain of its resilient members are held under a predeterminable stress or compression, without being inflated with air, and the tread or road-engaging surface is itself resilient so as to be indentable, as distinguished from treads which are non-indentable and with which the whole tire or wheel must be raised in passing over even the smallest obstacles. My tire is also characterized by specially-formed concentric rings whereof the outer is connected with the inner solely by means of compressed resilient bodies which are interengaged with suitably-formed pockets or recesses in the rings. A further characteristic of my tire is the provision of means by which the resilient material is divided into bodies of comparatively small size, arranged that air may circulate through and around them, thus keeping the resilient material from deterioration by overheating.

In the accompanying drawings Figure 1 is a side view of a wheel provided with a tire embodying my invention, Fig. 2 is a transverse section of the tire and outer portion of the wheel, Fig. 3 is a side view of a portion of the same, on a larger scale than in Fig. 1, Fig. 4 is a central section through the tire, and Fig. 5 is a transverse section in a plane passing between the resilient compressed members. The planes of section of the several sectional views are indicated by broken lines numbered to correspond with the respective figures.

In carrying out my invention I provide a tire whereof the body-portion is formed by very soft resilient material, pure rubber, unmixed with ingredients other than necessary for vulcanization, being preferably employed, and the same being vulcanized so as to be as soft and resilient as reasonably possible without being porous or spongy. The said soft tire-body is held in a normally-compressed condition between concentric metal rings of which the outer is provided, in the construction shown, with a tread or road-engaging surface made of rubber or rubber composition much more hard and firm than the material of the inner tire-body. The soft tire-body is preferably divided into a plurality of units or members of uniform size and shape, and in the construction illustrated each of said units comprises a cylindrical body 6 having at the central part thereof a larger spherical portion 7. The cylindrical members 6 are perforate axially thereof, and the longitudinal openings are enlarged concentrically with the spherical portions 7. The soft resilient units are held between concentric inner and outer metal rings 8 and 9, and in the adjacent faces of said rings there are formed sphero-segmental pockets or recesses intersected laterally by cylindro-segmental channels, said channels and recesses being adapted, respectively, to receive and fit around the portions 6 and 7 of the resilient units, partially inclosing the same. The inner ring 8 has inwardly extending flanges 10 at the lateral edges thereof, and the outer ring 9 has similar flanges 11 extending outwardly from the lateral edges thereof. The flanges 11 of the outer ring inclose the sides of the resilient tread-member 12, whereof the form may be similar to that of an ordinary solid rubber tire. Preferably the tread-member is molded directly onto the outer ring 9, being held thereon by fitting into the depressions between the outwardly-swelled parts which form the recesses and transverse channels for the soft resilient units.

The inner ring 8 is divided at a point 13, indicated in Figs. 1 and 4, to facilitate the placing of the soft resilient units into the spaces therefor between the tire-rings 8 and 9. In assembling the tire the resilient units 6 are first placed within the recesses and transverse channels therefor in the outer ring, the ends of the inner ring are overlapped sufficiently to enable the said ring to be placed inside the resilient units, and said ring is then expanded to its normal form. The relative diameters of the two rings are such that in expanding the inner ring, as described, the resilient units are placed under compression, so that the sectional form thereof is rendered slightly elliptical, the dimensions thereof radially of the wheel being less than the dimensions circumferentially of the wheel, as indicated in Figs. 3 and 4.

The described tire is mounted on a wheel of which the rim is suitably formed to receive the same. In the structure shown in the drawings, an ordinary wheel, comprising a hub 14, wood spokes 15 and felly 16, is provided with a metal rim 17 having a flange 18 extending outwardly from the edge thereof at the inner side of the wheel. The rim is slightly larger at the side adjoining said flange 18, inclining conically therefrom toward the central part. The flanges 10 of the ring 8 are so proportioned as to fit upon said rim 17, one of said flanges 10 being pressed against the flange 18 onto the conical part of the rim, while the other of the flanges 10 rests upon the rim at the outer edge thereof. For holding the tire upon the rim 17, bolts 19 are passed through the felly 16 at several places, said bolts being provided at their outer ends with nuts 20 and washers 21. Said washers rest against the outer side of the ring 8 and have on their inner sides wedge-shaped lugs 22 which extend in over the rim 17, passing through notches in the adjacent flange 10, and being so proportioned that when the nuts 20 are tightened down the wedges will press outwardly upon and tend to slightly expand the ring.

It will be seen that, by the described means, the tire will be firmly secured in a fixed relation to the wheel, and the inner ring 8 of the tire maintained in expanded normal form. When the wheel is in use the tread-member 12 serves one of the usual purposes of a pneumatic tire, in that it is sufficiently resilient to be indentable by small obstructions, so that in passing over the same it is not necessary for the entire wheel to be raised. While serving the foregoing purpose, the tread-member may nevertheless be made of firm and durable material, and is not subject to punctures or blow-outs. The other most important function of a pneumatic tire is performed by the soft resilient units which are held under compression between the rings 8 and 9, the same absorbing and preventing the transmission to the vehicle of the many shocks and jars incident to the movement of the wheel over rough surfaces. The flanges 11 of the outer ring make the same sufficiently rigid to maintain a true circular form, so that the weight upon the wheel is distributed among a large number of the resilient units, or practically all of those below the plane of the wheel-axis at any moment. By such distribution of the weight upon the resilient units, and the initial compression thereof, it is practical to make the same of very soft and springy rubber, without the compression of the units in the lower portion of the wheel being great enough to cause those in the upper portion to become loose. Thus said resilient units may form the sole connection between the inner and outer rings 8 and 9, and a maximum of cushioning and shock-absorbing action attained, the units being deformable and yieldingly limiting displacement of the outer ring radially, circumferentially and laterally with respect to the inner ring. The interengagement of the spherical portions of the resilient units in the recesses therefor in the rings prevents lateral displacement of the outer ring relatively to the inner, and circumferential displacement of the rings is prevented by both the spherical and cylindrical parts of the units. The alternate compression and expansion of the units, when the wheel is in motion, causes a circulation of air through and around them, thereby cooling and preventing deterioration thereof by overheating. It will also be noted that the arrangement of the units is such that each has space at its sides into which the material may expand, so that full advantage is taken of all its resilience and capability of deformation.

Now, having described my invention, what I claim and desire to secure by Letters Patent is:

1. In a tire for vehicle wheels, an inner metal ring, an outer metal ring arranged concentrically with the inner, means for securing the inner ring on the rim of a wheel, a resilient tread-member on the outer ring, said rings having corresponding sphero-segmental recesses and cylindro-segmental lateral channels in the adjacent faces thereof, and soft resilient cushioning members disposed between the rings and fitting into said recesses and channels to connect the rings with each other yieldably.

2. In a tire for vehicle wheels, a metal ring having inwardly extending flanges at the sides thereof and provided in its outer face with sphero-segmental recesses and cylindro-segmental channels intersecting said recesses laterally, means for securing said ring upon the rim of a wheel, a similar outer ring disposed concentrically with the inner and having outwardly extending flanges and provided with recesses and channels in its inner face corresponding with those of the inner ring, a resilient tread-member held between the flanges of the outer ring, and a series of soft resilient cushioning bodies disposed between the inner and outer rings, said bodies each having a central spherical part fitting into said recesses and lateral cylindrical parts fitting into said channels in the rings.

3. In a tire for vehicle wheels, a plurality of resilient units made of soft rubber, each comprising a cylindrical body having a central spherical enlargement and being axially perforate, a pair of metal rings disposed concentrically and provided in their adjacent faces with recesses fitting about the inner and outer sides of the resilient units to partially inclose the same and hold them under a predeterminable compression, the units and rings being thereby interengaged so that said units yieldably limit relative displacement of the rings laterally, circumferentially and radially and form the sole connection between the rings, means for detachably securing the inner ring onto the rim of a wheel, and a resilient solid tread-member mounted on the outer ring.

ARTHUR L. RUNYAN.

Copies of this patent may be obtained for five cents each, by addressing the "Commissioner of Patents, Washington, D. C."